United States Patent
Liu

(10) Patent No.: US 9,948,330 B2
(45) Date of Patent: Apr. 17, 2018

(54) BLUETOOTH TRANSMITTER

(71) Applicant: Chiun Mai Communication Systems, Inc., New Taipei (TW)

(72) Inventor: Hsin-Chih Liu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/464,354

(22) Filed: Mar. 21, 2017

(65) Prior Publication Data

US 2017/0272107 A1 Sep. 21, 2017

(30) Foreign Application Priority Data

Mar. 21, 2016 (CN) .......................... 2016 1 0159805

(51) Int. Cl.
*H04B 7/00* (2006.01)
*H04B 1/034* (2006.01)

(52) U.S. Cl.
CPC ................... *H04B 1/0343* (2013.01)

(58) Field of Classification Search
CPC ..... H04W 84/18; H04W 88/06; H04W 76/02; H04W 88/02; H04M 2250/02; H04M 1/0214; H04M 1/72522; H04M 1/72519
USPC .................... 455/41.1, 41.2, 550.1
See application file for complete search history.

(56) References Cited

U.S. PATENT DOCUMENTS

| | | | | |
|---|---|---|---|---|
| 8,766,789 | B2 * | 7/2014 | Cosentino | G06F 19/3418 340/539.12 |
| 9,756,454 | B1 * | 9/2017 | Kelley | H04W 4/008 |
| 2007/0082713 | A1 * | 4/2007 | Tsai | H04M 1/6075 455/569.2 |
| 2010/0048244 | A1 * | 2/2010 | Goren | B60R 25/20 340/426.13 |
| 2011/0195752 | A1 * | 8/2011 | Siddiqui | G06F 1/1622 455/566 |

FOREIGN PATENT DOCUMENTS

| | | |
|---|---|---|
| CN | 1937645 A | 3/2007 |
| CN | 103618815 A | 3/2014 |
| TW | M305410 | 1/2007 |
| TW | M339887 | 9/2008 |

* cited by examiner

*Primary Examiner* — Nhan Le
(74) *Attorney, Agent, or Firm* — ScienBiziP, P.C.

(57) ABSTRACT

A Bluetooth transmitter with features to reduce the likelihood of unwitting loss includes a first housing, a second housing, a circuit board, and a button. The second housing couples to the first housing. A side of the second housing opposite to the first housing defines at least one groove for connecting to another housing or a holder. The circuit board is secured in the second housing. The button couples to the first housing and connects to the circuit board through the first housing. The button is configured to initiate a Bluetooth signal transmission.

13 Claims, 7 Drawing Sheets

BLUETOOTH TRANSMITTER

FIELD

The subject matter herein generally relates to assembly of a Bluetooth transmitter.

BACKGROUND

Bluetooth transmitters are normally designed in small sizes for convenient carrying. Patients in bad health may carry a Bluetooth transmitter with them everywhere as an emergency alarm. However, patients may drop or lose the Bluetooth transmitter due to its small size. A design and structure should be improved to make the loss and mishandling of the Bluetooth transmitter less likely.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
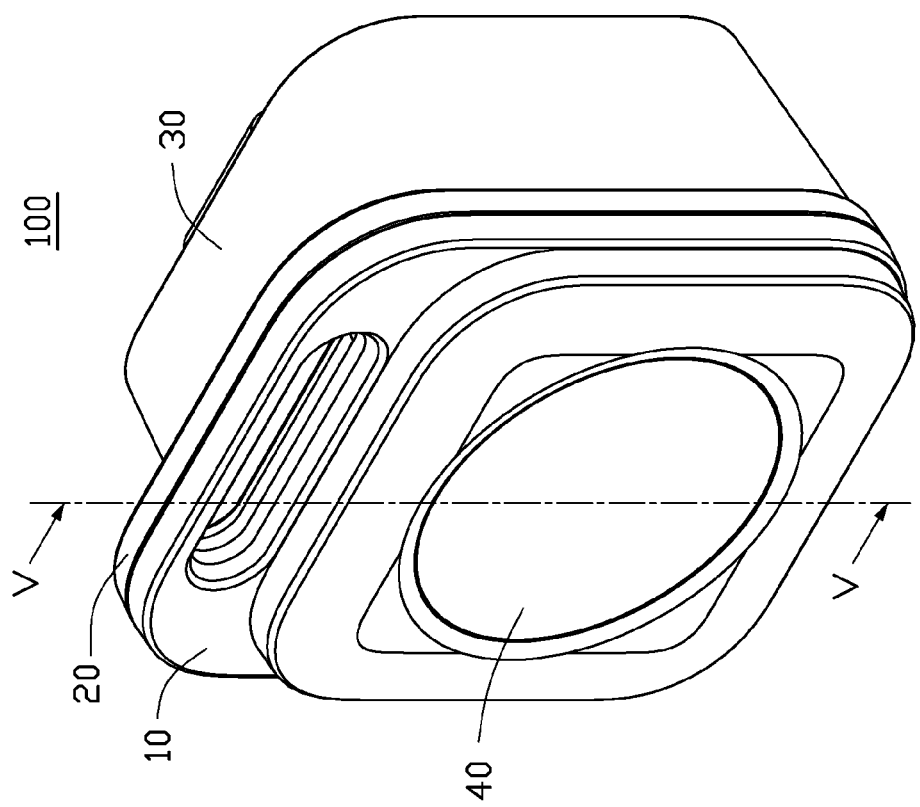
FIG. 1 is an isometric view of a first exemplary embodiment of a Bluetooth transmitter.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a first exemplary embodiment of a BLUETOOTH transmitter 100. The Bluetooth transmitter 100 is substantially cube-shaped and configured to be carried by a user. BLUETOOTH signals are broadcast when the transmitter is triggered.

Figure 2:
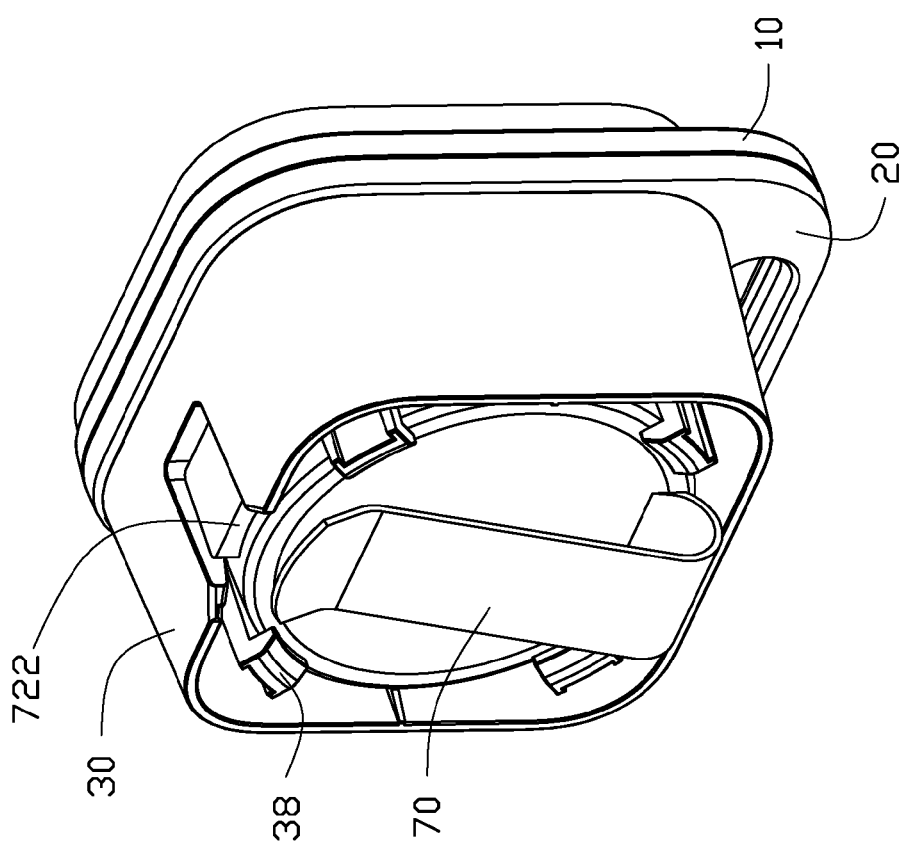
FIG. 2 is another isometric view of the Bluetooth transmitter of FIG. 1.
Figure 3:
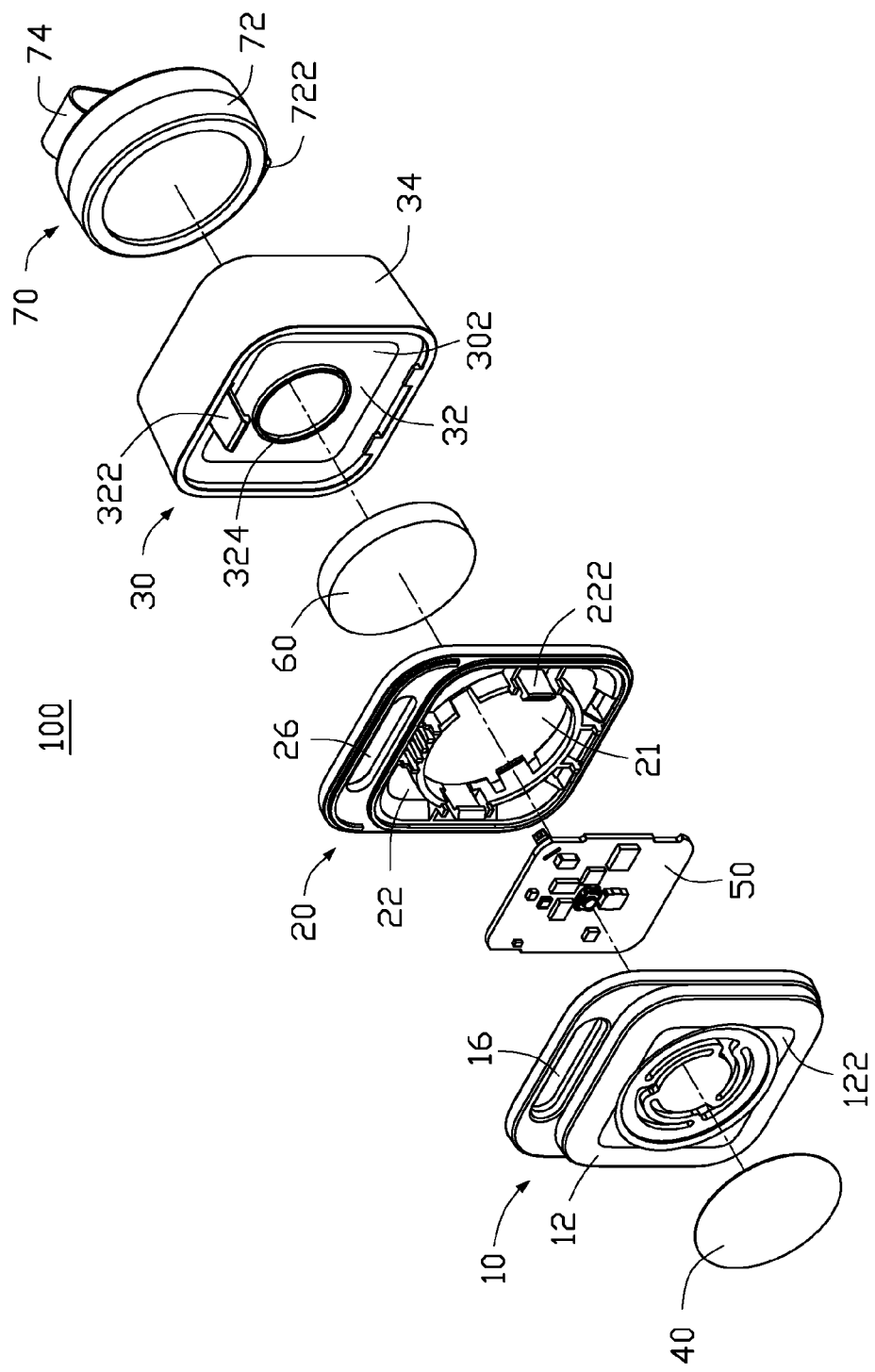
FIG. 3 is an exploded view of the Bluetooth transmitter of FIG. 1.

FIGS. 1, 2, and 3 illustrate that the Bluetooth transmitter 100 includes first housing 10, a second housing 20, a third housing 30, a button 40, a circuit board 50, a battery 60, and a holder 70.

Figure 4:
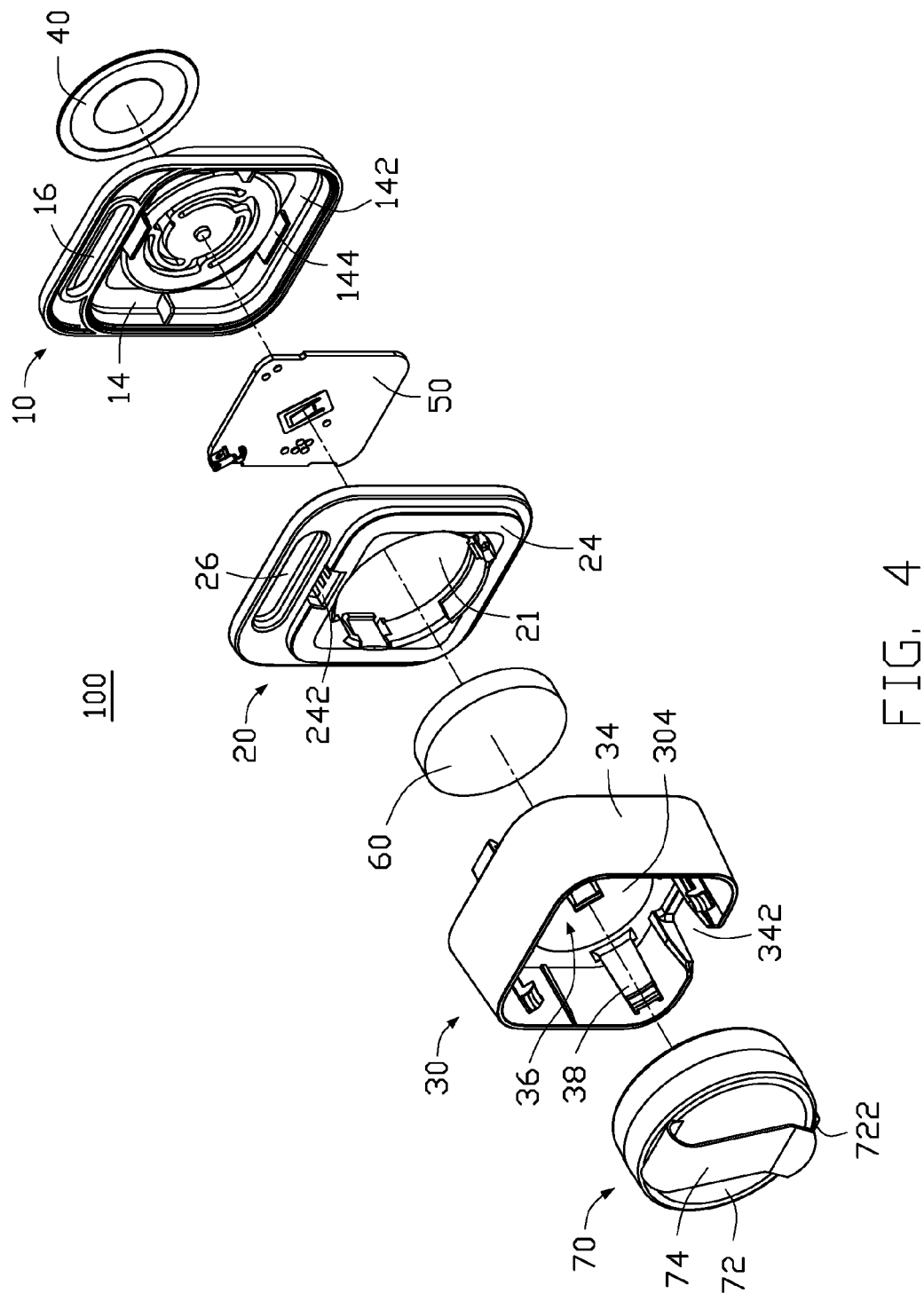
FIG. 4 is another exploded view of the Bluetooth transmitter of FIG. 1.

Referring to FIGS. 3 and 4, the first housing 10 is substantially a board-like structure with a predetermined thickness. The first housing 10 includes a front side 12 and a back side 14. The middle portion of the front side 12 recesses inwardly to form a concave surface 122. The concave surface 122 can be made of elastic material. Preferably, the concave surface 122 can be manufactured with hollows. The back side 14 recesses inwardly to form a receiving space 142. The back side 14 includes a plurality of protrusions 144 at the peripheral positions of the concave surface 122. The first housing 10 further includes a first hanging hole 16 on a side.

The second housing 20 is substantially a board with a predetermined thickness. The second housing 20 defines a hole 21 in the middle for receiving the battery 60. The second housing 20 includes a first side 22 and a second side 24. The first side 22 faces the back side 14 of the first housing 10. The first side 22 includes a plurality of positioning pieces 222 at the peripheral positions of the hole 21. The positioning pieces 222 are for cooperatively holding the circuit board 50. Preferably, the first side 22 includes four positioning pieces 222 positioned at quarter positions around the hole 21. The second side 24 defines at least one groove 242 at an upper end of the second side 24. The second housing 20 further includes a second hanging hole 26 on a side. In at least one exemplary embodiment, the first housing 10 and the second housing 20 can be integrally formed or pasted together. The second hanging hole 26 is coupled to the first hanging hole 16 for cooperatively receiving a hanging piece (not shown), such as a hanging cord, for hanging the Bluetooth transmitter 100 around another object such as the neck of the user.

The third housing 30 is substantially a hollow cube, and includes a bottom wall 32 and a peripheral wall 34. The bottom wall 32 includes a first bottom surface 302 and a second bottom surface 304. The first bottom surface 302 faces the second side 24 of the second housing 20. The first bottom surface 302 includes at least one engaging piece 322 at at least one peripheral position of the first bottom surface 302 to enable coupling to the groove 242, to couple the third housing 30 to the second housing 20. The first bottom surface 302 includes a rib 324 protruding from a middle portion of the first bottom surface 302, the rib 324 is for supporting the battery 60. The peripheral wall 34 surrounds the bottom wall 32 and extends outwardly, thus the peripheral wall 34 and the bottom wall 32 cooperatively form a cavity 36 for receiving the holder 70. The second bottom surface 304 includes a plurality of latches 38 extending outwardly, the latches 38 latch the holder 70 to the third housing 30. The peripheral wall 34 defines an opening 342.

The button 40 is positioned on the concave surface 122 of the first housing 10. The circuit board 50 is coupled to the plurality of positioning pieces 222. The circuit board 50 includes a plurality of electronic elements for transmitting and receiving Bluetooth signals. The button 40 can be pressed by the user, so that the button 40 contacts with the electronic elements on the circuit board 50 through the elastic concave surface 122, thus triggering Bluetooth signal transmission. The battery 60 is received in the hole 21 and electrically connected to the circuit board 50. The battery 60 provides power to the Bluetooth transmitter 100.

The holder 70 is received in the cavity 36 and can hold the Bluetooth transmitter 100 to any part of the clothing of the user. The holder 70 includes a base 72 and a hook portion 74. The base 72 is substantially cylindrical and is hold by the plurality of latches 38, and thus the holder 70 is attached to the third housing 30. The base 72 includes a connecting portion 722 protruding from the base 72. When the base 72 is received in the cavity 36, the connecting portion 722 is received in and is exposed from the opening 342. In at least one exemplary embodiment, the base 72 includes a flexible pull-ring. The connecting portion 722 is configured to connect to a retractable cord. The retractable cord is configured to extend to different lengths and can be rolled in the base 72, thus allowing coupling to an ID card or an entrance card. The hook portion 74 is a resilient piece of bent metal and attached to the base 72. The hook portion 74 extends outwardly from the base 72 and bends back to form a hook. The hook portion 74 can hook to an external object, such as the clothing of the user. The Bluetooth transmitter 100 can be secured on the clothing of the user by a cooperative latch of the hook portion 74 and the base 72.

Figure 5:
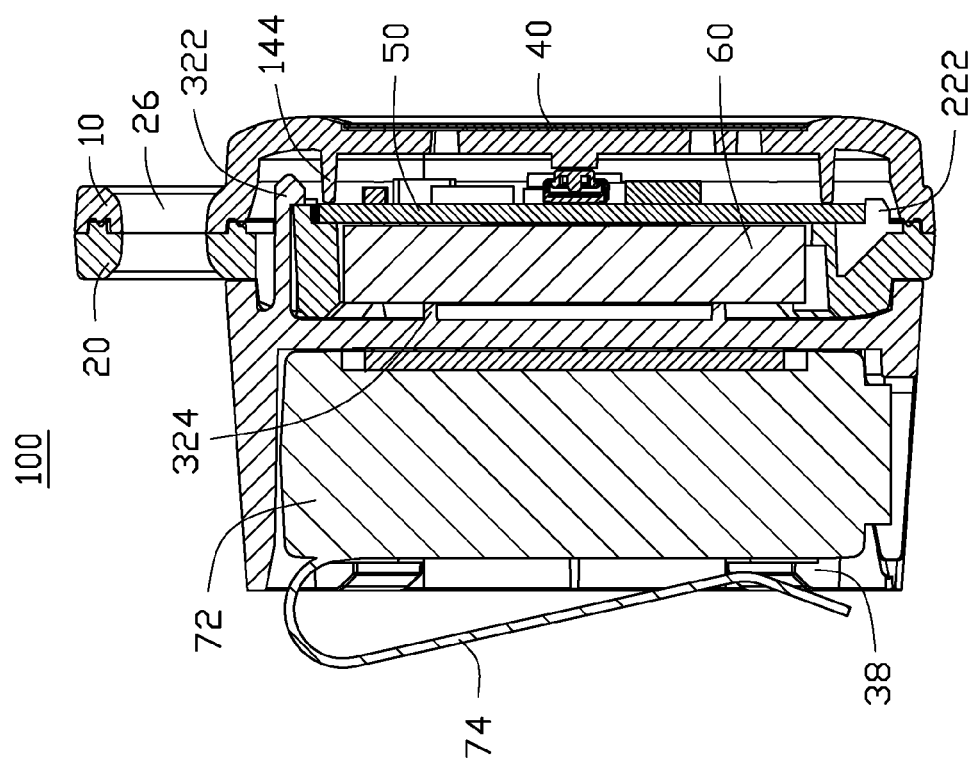
FIG. 5 is a cross-sectional view of the Bluetooth transmitter of FIG. 1 taken along line V-V.

Referring to FIG. 5, in assembly, the circuit board 50 is among the plurality of positioning pieces 222, and the button 40 is coupled to the concave surface 122. The first housing 10 and the second housing 20 are formed integrally or pasted together. The plurality of protrusions 144 support multiple positions of the circuit board 50 and further secure the circuit board 50. The battery 60 is received in the hole 21, the engaging piece 322 is coupled to the groove 242, thus the third housing 30 is coupled to the second housing 20. The battery 60 is held between the circuit board 50 and the rib 324. The base 72 is latched by the plurality of latches 38, and thus the holder 70 is coupled to the third housing 30. The connecting portion 722 is received in and exposed from the opening 342. The hook portion 74 protrudes from the cavity 36 and latches to an external object cooperatively with the base 72, thus the Bluetooth transmitter 100 can be secured to the an external object. Additionally, the first hanging hole 16 and the second hanging hole 26 can accommodate a hanging piece.

Figure 6:
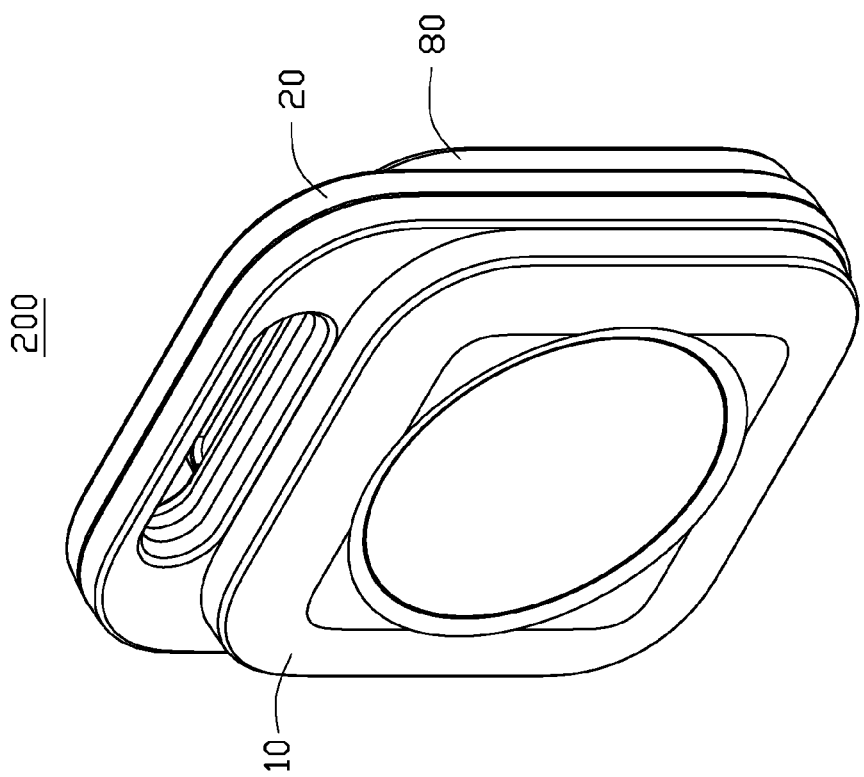
FIG. 6 is an isometric view of a second exemplary embodiment of the Bluetooth transmitter.
Figure 7:
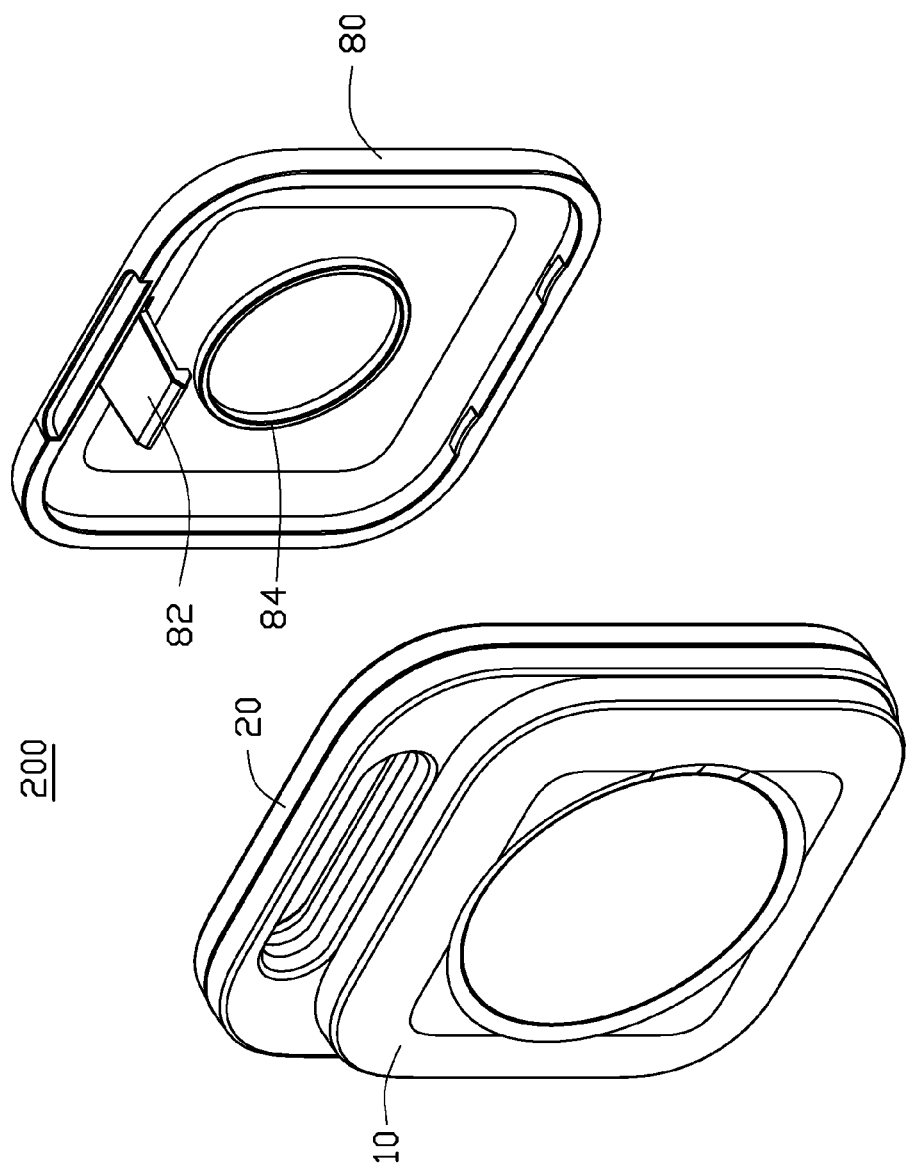
FIG. 7 is an exploded view of the Bluetooth transmitter of FIG. 6.

FIGS. 6 and 7 illustrate a second exemplary embodiment of a Bluetooth transmitter 200. The Bluetooth transmitter 200 includes a fourth housing 80 replacing the third housing 30 and the holder 70 of the first exemplary embodiment. Other elements are the same as those of the Bluetooth transmitter 100 of the first exemplary embodiment, and thus are omitted for clarity. The fourth housing 80 is substantially a thin board. The fourth housing 80 includes a hook piece 82 and a bearing portion 84 both protruding from a side of the fourth housing 80 and facing the second housing 20. The hook piece 82 corresponds to the engaging piece 322 of the first exemplary embodiment, and thus enables coupling to the groove 242, to couple the fourth housing 40 to the second housing 20. The bearing portion 84 corresponds to the rib 324 of the first exemplary embodiment, and supports the battery 60. The fourth housing 80 of the second exemplary embodiment is a thin board, which has a smaller thickness than the third housing 30 and the holder 70 of the first exemplary embodiment.

The Bluetooth transmitter 100 includes the first hanging hole 16, the second hanging hole 26, the connecting portion 722, and the hook portion 74. Multiple ways of securing the Bluetooth transmitter 100 to external objects are disclosed, and this is more convenient for the user. The hook portion 74 also enables clipping to the clothing of the user, this is convenient and provides a better user experience.

It is believed that the exemplary embodiments and their advantages will be understood from the foregoing description, and it will be apparent that various changes may be made thereto without departing from the scope of the disclosure or sacrificing all of its advantages. The examples herein described are mere illustrative exemplary embodiments of the disclosure.

What is claimed is:

1. A Bluetooth transmitter comprising:
   a first housing;
   a second housing, the second housing coupled to the first housing, the second housing defining a hole in the middle and comprising a first side and a second side, the first side facing the first housing, the first side comprising four positioning pieces arranged at quarter positions around the hole; wherein the second side is opposite to the first housing and defines a groove for connecting to another housing or a holder, wherein the groove is defined at an upper end of the second side;
   a circuit board, the circuit board secured in the second housing; and
   a button, the button coupled to the first housing and connected to the circuit board through the first housing, the button initiating a Bluetooth signal transmission.

2. The Bluetooth transmitter of claim 1, wherein the hole is for receiving a battery; the positioning pieces cooperatively hold the circuit board.

3. The Bluetooth transmitter of claim 2, further comprising a third housing coupled to the second housing, wherein the third housing is a hollow and comprises a bottom wall; the bottom wall comprises a first bottom surface and a second bottom surface; the first bottom surface faces the second side of the second housing.

4. The Bluetooth transmitter of claim 3, wherein the first bottom surface of the third housing comprises at least one engaging piece at at least one peripheral position of the first bottom surface, the at least one engaging piece is correspondingly coupled to the groove, thus to couple the third housing to the second housing; the first bottom surface comprises a rib protruding from a middle portion of the first bottom surface, the rib supports the battery, the battery is held between the rib and the circuit board.

5. The Bluetooth transmitter of claim 4, wherein the third housing further comprises a peripheral wall surrounding the bottom wall and extending outwardly, the peripheral wall and the bottom wall cooperatively form a cavity for receiving the holder; the second bottom surface comprises a plurality of latches extending outwardly, the plurality of latches latches the holder to the third housing.

6. The Bluetooth transmitter of claim 5, the holder received in the cavity, wherein the holder comprises a base and a hook portion, the base is hold by the plurality of latches so that the holder is attached to the third housing; the hook portion is a resilient piece of bent metal and attached to the base, the hook portion extends outwardly from the base and bends back to form a hook, the hook portion and the base are configured to cooperatively clip to an external object.

7. The Bluetooth transmitter of claim 6, wherein the peripheral wall defines an opening; the base comprises a connecting portion protruding from the base, the base is received in the cavity, the connecting portion is received in and is exposed from the opening.

8. The Bluetooth transmitter of claim 6, wherein the base comprises a flexible pull-ring, the connecting portion is configured to connect to a retractable cord; the retractable cord is configured to extend to different lengths and is rolled in the base.

9. The Bluetooth transmitter of claim 2, wherein the first housing comprises a front side and a back side, a middle portion of the front side recesses inwardly to form a concave surface, the concave surface is made of elastic material, the concave surface is manufactured with hollows and is elastic, the button is positioned on the concave surface and is configured to contact with electronic elements on the circuit board through the concave surface to trigger the Bluetooth signal transmission.

10. The Bluetooth transmitter of claim 9, wherein the back side recesses inwardly to form a receiving space, the back side comprises a plurality of protrusions at peripheral positions of the concave surface, the protrusions support multiple positions of the circuit board and secure the circuit board.

11. The Bluetooth transmitter of claim 2, further comprising a fourth housing, wherein the fourth housing is a thin board, the fourth housing comprises a hook piece and a bearing portion both protruding from a side of the fourth housing and facing the second housing, the hook piece correspondingly couples to the groove to couple the fourth housing to the second housing; the bearing portion supports the battery.

12. The Bluetooth transmitter of claim 1, wherein the first housing comprises a first hanging hole on a side, the second housing comprises a second hanging hole on a side, the second hanging hole couples to the first hanging hole for cooperatively receiving a hanging piece to hang the Bluetooth transmitter around another object.

13. The Bluetooth transmitter of claim 12, wherein the first housing and the second housing are integrally formed or pasted together.

* * * * *